(12) United States Patent
Kato et al.

(10) Patent No.: US 6,465,973 B1
(45) Date of Patent: Oct. 15, 2002

(54) PERMANENT MAGNET 2-PHASE DC BRUSHLESS MOTOR

(75) Inventors: Takashi Kato; Tadashi Takano; Junetsu Hayashi, all of Mori-machi (JP)

(73) Assignee: Kabushiki Kaisha Moric, Mori-machi (JP)

( * ) Notice: Subject to any disclaimer, the term of this patent is extended or adjusted under 35 U.S.C. 154(b) by 43 days.

(21) Appl. No.: 09/693,155

(22) Filed: Oct. 20, 2000

(30) Foreign Application Priority Data

Oct. 26, 1999 (JP) .......................................... 11-304061

(51) Int. Cl.[7] .................................................. H02P 6/00
(52) U.S. Cl. ........................ 318/254; 318/722; 318/724
(58) Field of Search ................................. 318/138, 254, 318/439, 700, 720, 722, 724; 310/68 R, 179, 184, 185, 198

(56) References Cited

U.S. PATENT DOCUMENTS

| | | | | |
|---|---|---|---|---|
| 4,520,300 A | * | 5/1985 | Fradella ...................... | 318/603 |
| 4,952,853 A | * | 8/1990 | Archer ........................ | 318/254 |
| 5,134,349 A | * | 7/1992 | Kruse ......................... | 318/254 |
| 5,150,030 A | * | 9/1992 | Ito et al. ..................... | 318/811 |
| 5,321,342 A | * | 6/1994 | Kruse ......................... | 318/254 |
| 5,668,450 A | * | 9/1997 | Glasier et al. .............. | 318/254 |
| 5,694,015 A | * | 12/1997 | Luniewicz et al. ......... | 318/611 |

* cited by examiner

*Primary Examiner*—Bentsu Ro
(74) *Attorney, Agent, or Firm*—Ernest A. Beutler

(57) ABSTRACT

Several embodiments of improved 2-phase DC brushless motors. In each embodiment, there are pluralities of windings and the current flow through the windings is controlled by a reduced number of main switches from the prior art type of devices. In accordance with a feature of certain embodiments, pair of windings are provided with a common CT that detects the current flowing through the connected pair of windings and which functions to control the main switching device in a pulse width modulated manner. As a result, the control circuit can be simplified and reduced in cost without sacrificing performance.

6 Claims, 4 Drawing Sheets

PERMANENT MAGNET 2-PHASE DC BRUSHLESS MOTOR

BACKGROUND OF THE INVENTION

This invention relates to a permanent magnet DC brushless motor and more particularly one of the 2-phase types.

It has been proposed in many applications where accessories or auxiliaries were driven by an internal combustion engine, such as motor vehicles, to drive some or all of these accessories by DC motors. For example, the use of electrically driven hydraulic power steering apparatus has been proposed.

Conventionally, DC motors have been widely used that employ brushes and commutaters. There are a number of disadvantages with this type of mechanism. For example, the operation of the brush with the commutator causes not only wear of the brushes but also wear of the comutator. This also causes the generation of sparks, which can cause noises both electrical and audible. Obviously, this type of mechanism requires servicing of the brushes and commutators and there is a limited operational speed for this and other reasons.

It has been proposed, therefore, to provide a brushless type of DC motor. Generally, this type of motor includes a rotor and an armature that cooperate with each other. However, in order to detect and control the rotational element of the rotor, semi-conductor devices, often referred to as inadverters, are used to accomplish switching of current through each armature coil. Generally, 3-phase units are employed and there is a number of windings frequently associated with each phase. The invertors or, as hereinafter identified, main switch devices, are pulsed with modulated controlled (PWN) with either sign wave (180° electrification) or rectangular wave (120° electrification) control. As may be seen in FIG. 1, which is a graphical and schematic representation of a 3-phase machine of this type, an electrical battery or other DC power source indicated at 11 is employed for powering the various windings of the motor 12 through an inverter switching bridge circuit 14. Such a system requires at the minimum six switching devices or inverters or solid-state devices $S_1$, $S_2$, $S_3$, $S_4$, $S_5$, and $S_6$. It should be noted that these motors are designed so as to rotate in opposite directions frequently. These switching devices generally are bipolar transistors or the like. Agate circuit, which is not shown, is employed for turning on and off these main switching devices based upon the rotational angle of the rotor so as to supply winding circuit tone or more of the 3-phase windings. The disadvantage with this type of arrangement is that it requires a minimum of six main switching devices. The current supplied to any one winding is via two main switching devices and a voltage drop occurs across each of them. Therefore, as the main switching devices that conduit the winding current are increased in number, the voltage applied to the corresponding winding decreases. This has a distinct disadvantage, particularly in the case of motor vehicles where relatively low voltage battery power sources are employed. The voltage drop caused by the main switching devices becomes relatively large in relation to the source voltage and motor performance decreases.

As a further disadvantage, if the main switching devices of the inverter are driven by 180° electrified sign waves, the maximum value of current through the main switching devices reaches the square root of 2 times the effective value of the current. Therefore, the rating of the main switching devices must be raised and cost increases.

There are inverters that are driven by 120° electrified rectangular waves. Inverters of this type, however, the torque fluxuations become large and vibrations and undesirable sounds increase. Furthermore, since the driving efficiency of the motor is low, the amount of heat generated is great so that it is difficult to reduce the size of the inverters.

It is, therefore, a principal object to this invention to provide an improved brushless DC electric motor that reduces the number of solid state switching devices required and also thus permits a greater performance. FIGS. 2 and 3 show schematically a device of the type, which may be utilized to improve the performance and reduce the number of switching devices in that it uses a 2-phase system. However, as will become apparent as this description proceeds, this device still has disadvantages in that it requires multiple switching devices each for the respective winding. The remaining figures show embodiments that further reduce the number of switching devices.

It is, therefore, a still further object to this invention to provide an improved 2-phase multiple winding brushless electric motor that has a reduced number of switching devices and thus, greater performance and lower costs.

SUMMARY OF THE INVENTION

A first feature of this invention is adapted to be embodied in a brushless type, 2-phase, multiple winding electric motor. The electric motor includes 2 phases each of which has two "n" windings and "N" as a whole integer. These windings are associated with permanent magnets that circumferentially spaced and are switched by switching devices so as to alter the current flow through them to drive the rotor. The switching devices are operated from a direct current power source and controlled by a respective main switching device. The current value flowing through the windings of each phase is detected by a CT device.

In accordance with another feature of the invention, there is a plurality of windings for each phase. In other words, "N" is greater than 1 and the windings are paired so that a single switch controls the flow through two windings and a single CT detects the flow of current through the paired windings.

DETAILED DESCRIPTION OF THE PREFERRED EMBODIMENT

Figure 1:
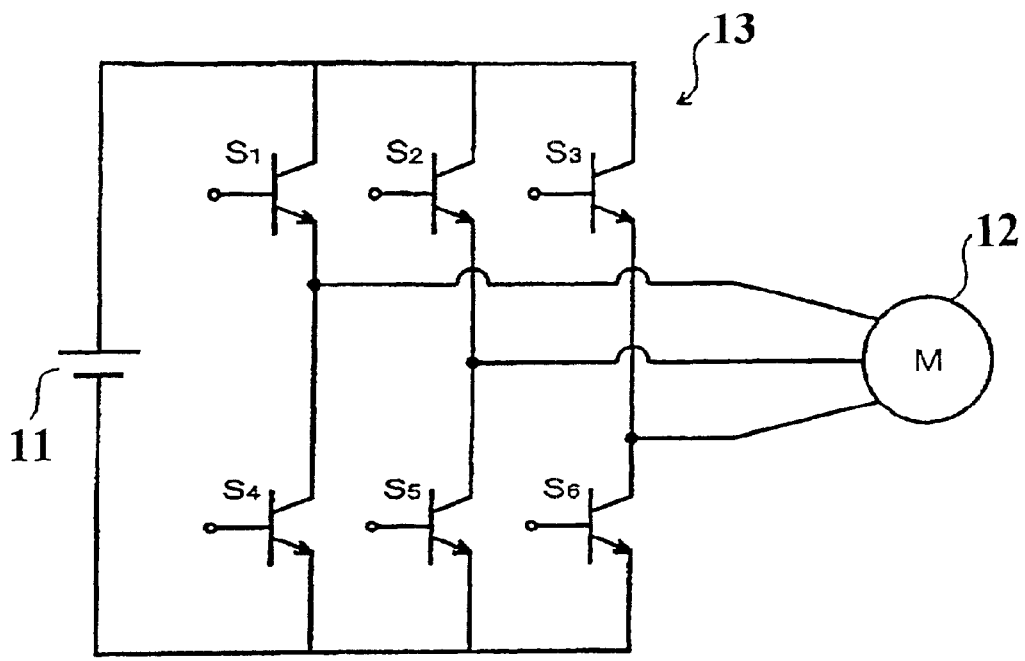
FIG. 1 is a partially schematic conceptual diagram of a 3-phase inverter and DC brushless motor constructed in accordance with the prior art.
Figure 2:
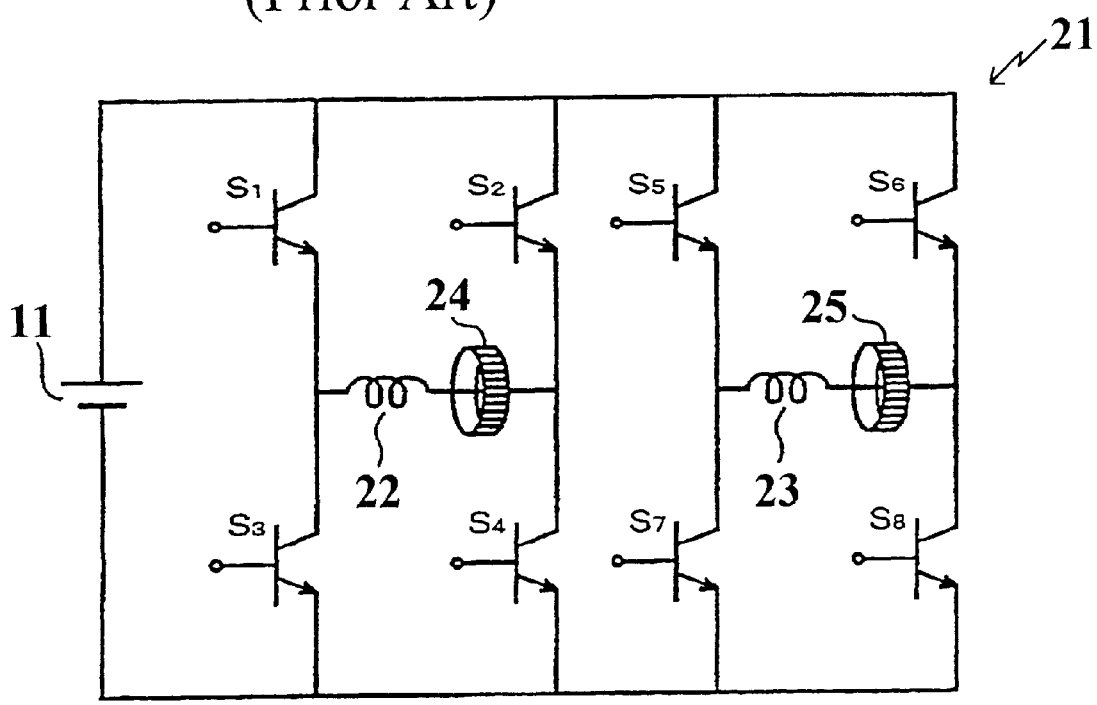
FIG. 2 is a view in part similar to FIG. 1 but shows in more details a 2-phase inverter and electrically motor constructed in accordance with a first embodiment of the invention.

FIG. 2 is a view that shows the control circuit of one phase of an inverter and connected with a 2-phase DC brushless electric motor constructed in accordance with a first embodiment of the invention and which has some improvement over the prior art, but still can be further improved, as will be described in conjunction with the following embodiments.

Figure 3:
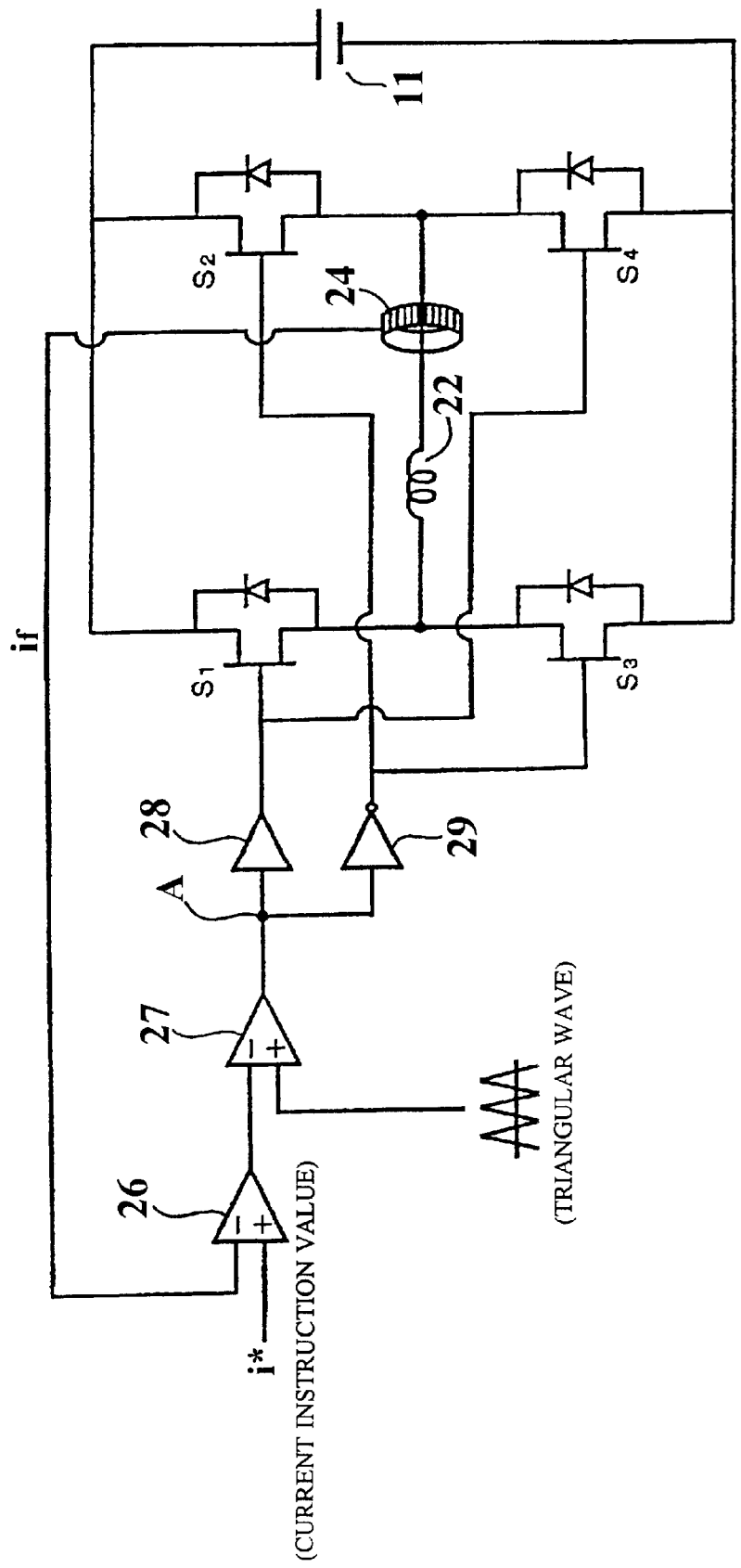
FIG. 3 is a diagram illustrating the construction of a control circuit for one of the phases of the inverter and 2-phase electrical motor shown in FIG. 2.

In this first embodiment of FIGS. 2 and 3, a battery, again indicated by the reference numeral 11 supplied current through an inverter, indicated by the reference numeral 21, to a pair of windings 22 and 23 of a 2-phase DC electric motor of the brushless type. This motor includes a rotor that has a plurality of windings, which are controlled, in a manner to be described, so as to change the current flow through them and through cooperation with permanent magnets (not shown) of a stator (also not shown) will effect rotation of the rotor. Current is supplied by the inverter 21 to the windings 22 and 23 in forward and reverse directions using main switching elements $S_1$–$S_4$ and $S_5$–$S_8$, respectively. This current flow is sensed by current transformers, generally referred to as CT devices, and specifically hall type (HCT) 24 and 25. The output $i_f$ of the HCT 24 and 25 reverses in output voltage polarity when the winding current reverses in flow direction. The current flow is controlled by a circuit shown best in FIG. 3 and which is illustrated for only one of the windings 22.

The output $i_f$ of the HCT 24 is inputted to an inversion input terminal of a comparator 26. A non-inversion input terminal of this comparator 26 receives input of an electric current instruction value i* which indicates the load demand on the brushless DC motor.

The output (i*–$i_f$) of the comparator 26 is inputted to a non-inversion input terminal of a further comparator 27. A non-inversion input terminal of this comparator 27 receives input of a triangular wave. Therefore, the voltage at an output terminal A of the comparator 27 has a PWM (pulse width modulation) waveform that changes in duty in correspondence to the magnitude of (i*–$i_f$). This PWM output is led to the gates of the main switching devices $S_1$, $S_4$ via a buffer gate 28, and is also led to the gates of the main switching devices $S_2$, $S_3$ via an inverter 29.

Figure 4:
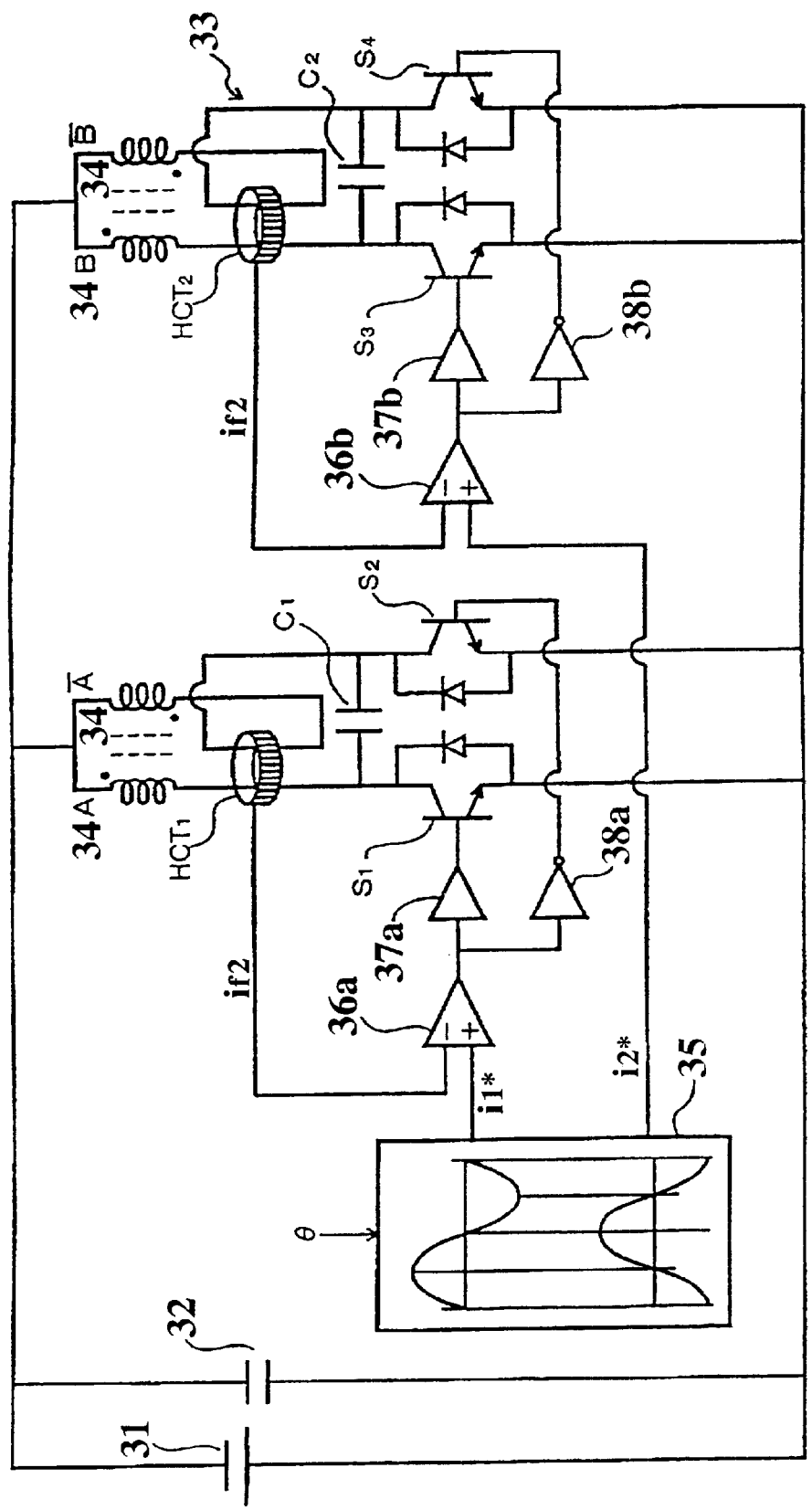
FIG. 4 is a circuitry diagram of a preferred embodiment of the invention and represents a significant improvement over the constructions shown in FIGS. 2 and 3.

Thus, by using a 2-phase structure rather than a 3-phase structure, it is possible to reduce the number of switching devices since the number of windings is reduced. However, the disadvantages of the plurality of switches as previously mentioned is nevertheless present in this arrangement. Therefore, a still further embodiment of the invention is proposed which will reduce the number of main sensing devices and also the number of HCT or CT employed so as to control the flow through these windings. FIG. 4 shows a second embodiment wherein the number of switching devices are reduced.

In this a direct-current power source formed by a battery 31, supplies power via a smoothing capacitor 32 to an inverter, indicated generally at 33. The inverter 33 supplies current to bifilar-wound armature windings (stator coils) 34 A, 34 A and 34 B, 34B so that current flow through the windings 34A, 34A and 34B, 34B in opposite directions.

The inverter 33 has four main switching devices $S_1$–$S_4$ connected to the windings 34A, 34A and 34B, 34B in series. The four series circuits of the main switching devices $S_1$–$S_4$ and the windings 34A, 34A and 34B, 34B are connected to the battery 31 in parallel. The main switching devices $S_1$–$S_4$ are semiconductor devices, such as bipolar transistors, MOS-FETs, or the like, and are provided with inverse-parallel connected diodes (parasitic diodes).

The main switching devices $S_1$, $S_2$ of the same phase are interconnected at their input terminal sides (sides of the windings 34A, 34A) via an anti-surge capacitor $C_1$.

Similarly, the switching devices $S_3$, $S_4$ are interconnected at their input terminal sides (sides of the windings 34B, 34B) via an anti-surge capacitor $C_2$. Hall CTs ($HCT_1$, $HCT_2$) are disposed between the windings 34A, 34A and the anti-surge capacitor $C_1$ and between the windings 34B, 34B and the anti-surge capacitor $C_2$, respectively. The windings 34A and 34B are inverted so that currents flow through the windings 34A and 34B in a direction opposite to the direction of currents through the windings 34A, 34B within the $HCT_1$, $HCT_2$.

Reference numeral 35 represents an electric current instruction value generating circuit formed by a microcomputer. The electric current instruction value generating circuit 35 calculates an electric current instruction value i* ($i_1$*, $i_2$*) based on the rotational angle of the rotor, and outputs the value. The rotational angle θ of the rotor is detected by a rotary encoder, a Hall device, or the like which is not shown in the drawings. As the electric current instruction values $i_1$*, $i_2$*, it is possible to use, for example, sine waves that are shifted 90° in phase from each other.

The electric current instruction values $i_1$*, $i_2$* are inputted to non-inversion input terminals of hysteresis comparators 36 (36a, 36b). Output voltages of the $HCT_1$, $HCT_2$ are inputted to inversion input terminals of the hysteresis comparators 36. The outputs of the hysteresis comparators 36 are inputted to control terminals (gates) of the main switching devices $S_1$, $S_3$ via buffer gates 37 (37a, 37b), and are inputted to control terminals (gates) of the main switching devices $S_2$, $S_4$ via inverters 38 (38a, 38b).

In operation of this embodiment, the electric current instruction value generating circuit 35 calculates a magnitude and a phase of the armature current needed to produce a target torque (a necessary torque determined by a calculation based on a load and the like) based on the rotational angle θ of the rotor. From this calculation, the electric current instruction value generating circuit 35 outputs the electric current instruction values i* ($i_1$*, $i_2$*) (vector control).

The hysteresis comparators 36, which form hysteresis circuits, each calculate the differences between the respective instruction current values i* and the outputs $i_{f1}$, $i_{f2}$ of the $HCT_1$, $HCT_2$. When the differences equal the upper and lower limits of the hysteresis circuits, the output terminal voltages of the hysteresis comparators 36 switch on and off. The time ratio of the on-off changes, that is, the duty ratio, corresponds to the differences (i*–$i_f$).

Thus the output of each comparator 36 becomes a PWM current control signal. Based on the on-off changes of the PWM current control signal, the main switching devices $S_1$, $S_3$ and the main switching devices $S_2$, $S_4$ alternately turn on and off, respectively. Therefore, winding current alternately flows through the windings 34A, 34A and 34B, 34B. Since the windings 34A, 34A and the windings 34B, 34B are wound in opposite directions, respectively, the same magnetic poles are alternately magnetized in opposite polarities.

In this embodiment, current through the windings 34A, 34 A, 34B, 34B to the $HCT_1$, $HCT_2$ flows directions opposite to each other, so that polarity of the detected output if is inverted depending on the direction of the winding current. Since the instruction current value i* inputted to the hysteresis comparator 36 is also inverted, there is no need to invert the outputs of the $HCT_1$, $HCT_2$ in polarity. That is, a polarity inversion circuit becomes unnecessary, and therefore the circuit construction is simplified.

In this embodiment, the instruction current value generating circuit 35 outputs 180° form sine waves that are shifted by 90° in phase from each other. This reduces harmonic components, and is therefore desirable for smooth operation. However, since the peak value of the winding current through the main switching devices $S_1$–$S_4$ is 1.4 ($=2^{1/2}$) times the effective value, there is a need to increase the rating of the main switching devices $S_1$–$S_4$.

In order to solve these drawbacks, it is preferred to use 180° form rectangular waves (square waves) instead of sine waves. In the case of perfect square waves, the ratio between the effective value and the mean value (form factor) becomes 1, so that the rating of the main switching devices $S_1$–$S_4$ can be lowered. Therefore, the inverter 33 can made smaller in size and less costly.

Since the motor is of the two-phase type and each winding current is controlled by one main switching device $S_1$–$S_4$, it becomes unnecessary to secure a dead time for preventing a short circuit, between drive signals to the main switching devices $S_1$–$S_4$. Therefore, the electric current use efficiency increases.

Figure 5:
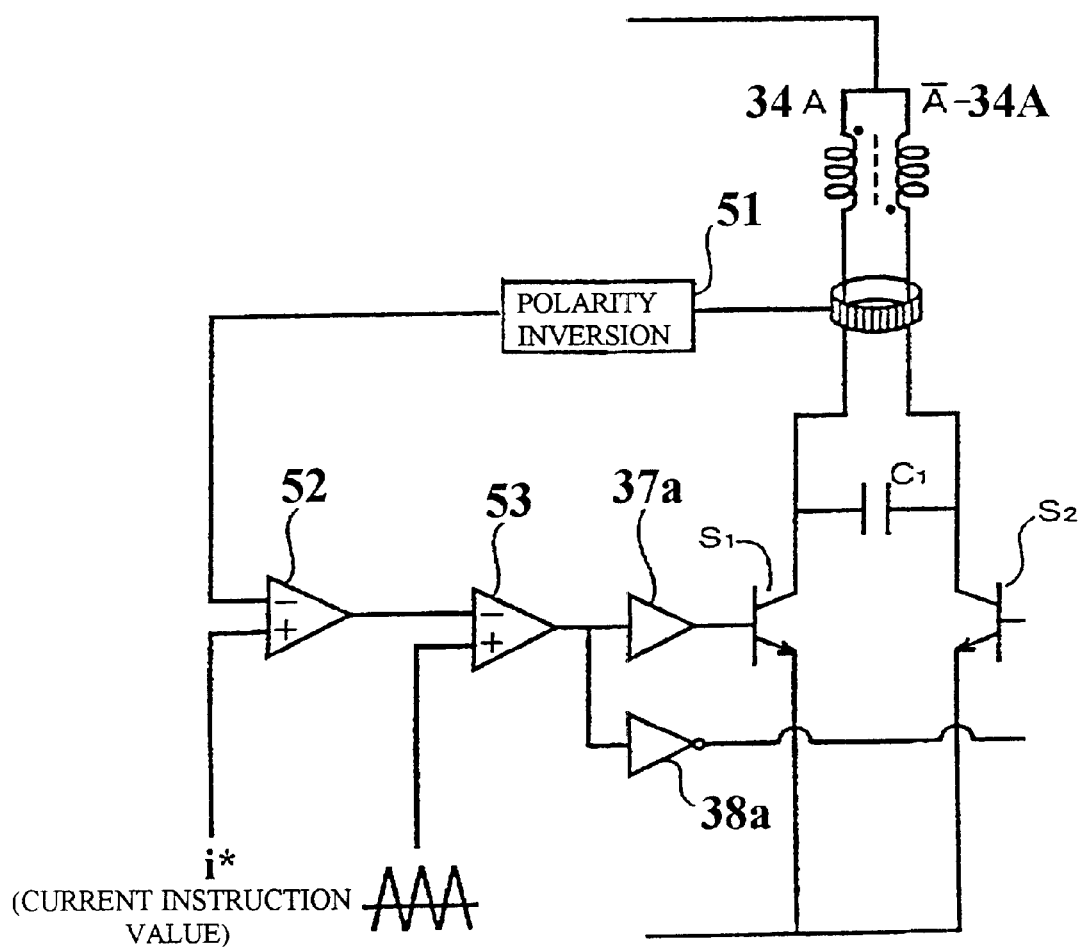
FIG. 5 is a diagram illustrating a circuit construction for one phase of a 2-phase electrical motor constructed in accordance with a third and further preferred embodiment of the invention.

FIG. 5 is a diagram illustrating a circuit construction for one phase in accordance with a further embodiment of the invention. Since this embodiment is similar to that of FIG. 4, a portion of the circuit is omitted. In this embodiment, currents flow through windings 34A, 34A̲ are not reversed within an $HCT_1$ but flow in the same direction. Thus, the width of output of the HCT can be expanded to twice the width of output provided in the previous embodiment. That is, in the case of the embodiment of FIG. 4, currents flow through the windings 34A, 34A̲ in the directions opposite to each other, causing the output of the $HCT_1$ to changes in positive and negative directions with reference to a reference voltage. The output range for one of the windings 34A or 34A̲ is limited to ½ of the output range (range, width) of the $HCT_1$.

In the embodiment shown in FIG. 5, however, it is possible to detect the current through the windings 34A, 34A̲ by using the entire output range of the $HCT_1$, so that the current detecting precision improves.

In this embodiment, there is a need to invert the current value $i_f$ for the winding 34A̲. This is done in a polarity inversion circuit 51 and to input the inverted value to a comparator 52. The comparator 52 determines a difference ($i^*-i_f$) between the electric current instruction value $i^*$ and the output $i_f$ of the inversion circuit 51. The difference ($i^*-i_f$) is compared with a triangular wave by a comparator 53. Then, a PWM control signal whose duty changes corresponding to the magnitude of the difference ($i^*-i_f$) is sent to a buffer gate 37a and an inverter 38a. As a result, the on/off condition of the main switching devices $S_1$, $S_2$ is controlled.

Thus, from the foregoing description it should be readily apparent that the described embodiments of the invention provide an improved permanent magnet DC brushless motor that operates on a 2-phase principal and wherein the main switching device and controlling CT for detecting the angular rotation and for controlling the current flow through the windings of the phases. The arrangement also provides a reduced number of main switching devices and a more simplified circuit, particularly in certain embodiments. Of course, the foregoing description is that of a preferred embodiment of the invention and various changes and modification may be made without departing from the spirit and scope of the invention, as defined by the appended claims.

What is claimed is:

1. A permanent magnet 2-phase DC brushless motor comprising a stator coil having a 2-phase and 2n winding construction, where "n" is equal to a whole integer greater than one (1), a rotor juxtaposed to said stator and carrying a plurality of permanent magnets, a plurality of windings for each phase being connected to a direct-current source through a common main switching device and a plurality of common CTs for detecting the value of current flowing through each of said connected plurality of windings, each of said main switching devices being PWM-controlled by delivering a difference between a winding current value detected by the respective CT and an electric current instruction value to the respective main switching device via a hysteresis circuit.

2. A permanent magnet 2-phase DC brushless motor as set forth in claim 1 wherein n is equal to two (2).

3. A permanent magnet 2-phase DC brushless motor as set forth in claim 2, wherein the two windings of each phase are bifilar-wound.

4. A permanent magnet 2-phase DC brushless motor as set forth in claim 2 wherein the main switching devices of the two phases are PWM-controlled with 180° form alternating waveforms that differ from each other by 90° in phase.

5. A permanent magnet 2-phase DC brushless motor as set forth in claim 1, wherein the windings of each phase are bifilar-wound.

6. A permanent magnet 2-phase DC brushless motor as set forth in claim 5, wherein the main switching devices are PWM-controlled with 180° form alternating waveforms that differ from each other by 90° in phase.

* * * * *